Nov. 18, 1941.  J. M. SCHUMANN  2,263,277
KEY HOLDER FOR CHUCKS
Filed Jan. 20, 1940
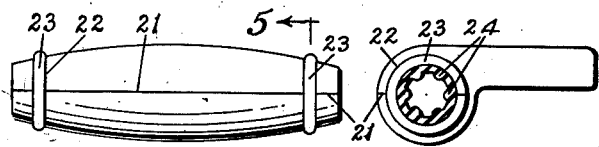
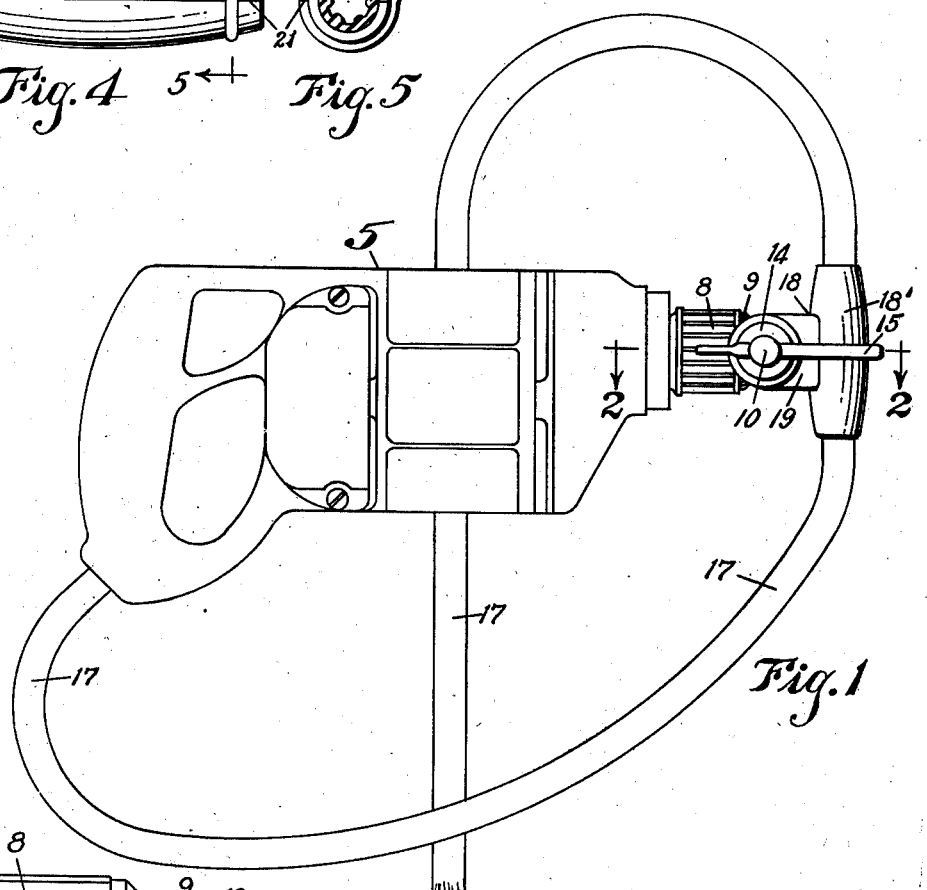
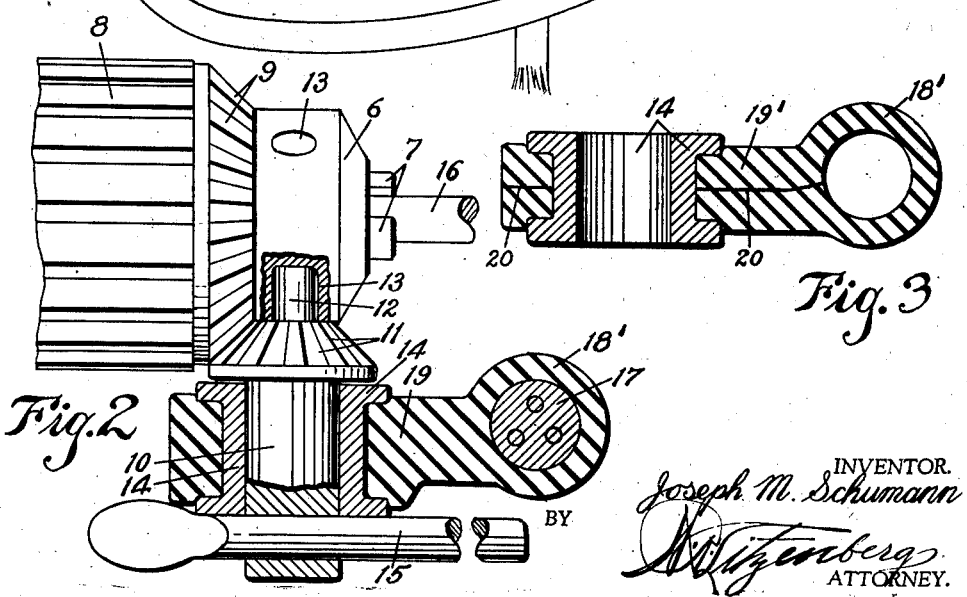
INVENTOR.
Joseph M. Schumann
BY
ATTORNEY.

Patented Nov. 18, 1941

2,263,277

UNITED STATES PATENT OFFICE 2,263,277

KEY HOLDER FOR CHUCKS

Joseph M. Schumann, Manhattan Beach, Calif., assignor to Zephyr Manufacturing Company, Inc., Los Angeles, Calif.

Application January 20, 1940, Serial No. 314,831

6 Claims. (Cl. 248—1)

My invention relates to key holders for chucks and is designed to conveniently and operatively hold the key used in operating a chuck to tighten or to loosen the jaws of the chuck, whereby said key will always be conveniently available without chance of being lost or misplaced when a workman needs it.

It is known that in operating the portable electric tools, such as drills and the like, where a power operated drill or other tool is held by a chuck, that a key is required to loosen or tighten said chuck, and that it is common for said key to be misplaced or inconveniently placed, whereby loss of time results in making the required changes or adjustments of the tool.

My invention has for its object to provide a simple, practical and convenient key holder which will be attached to the power cord of the motor drill or other tool, whereby said key is always conveniently available for use.

In order to explain my invention, I have illustrated the same on the accompanying sheet of drawings, which I will now describe.

Figure 1 is a side elevation of a power drill, showing my key holder in place on the electric cable and in place for actuating the chuck;

Figure 2 is a fragmentary view, partly in section, on an enlarged scale, showing my key holder with the key mechanism in operative position for actuating the chuck;

Figure 3 is a sectional view through a modified form of the invention; and

Figs. 4 and 5 are elevation and end views, partly in section on line 5—5 of a further modified embodiment of the invention.

Referring now in detail to the drawing, I have shown a known type of portable electric tool, such as a power operated drill, designated as a whole 5, having the chuck 6, with the chuck jaws 7, 7, and the adjusting member 8, having the beveled teeth 9, by which it is turned to tighten or loosen the chuck jaws 7, 7. This member 8 is operated by a key mechanism which includes a short shaft 10, having a beveled gear portion 11, and an insert pin or extension 12 adapted to be inserted into holes, as 13, in the chuck 6, as shown in Fig. 2, with the beveled gear portion 11 in mesh with the beveled gear portion or end of the operating or adjusting member 8, as indicated in said Fig. 2. A spool-like member 14 is on the short shaft 10, and a pin or key member 15 is inserted through the outer end of said shaft 10, and by means of which it is turned by hand for turning the member 8 for the purpose of tightening or loosening the chuck jaws on the tool, designated 16.

The cable for supplying current to the tool is designated 17, and my invention provides a key-holding member, as 18, adapted to be placed on said cable at a suitable distance from the tool proper so as to make it possible and convenient to bend the cable around to the operating end of the tool, whereby the key mechanism can be attached to the chuck, as indicated in Figs. 1 and 2, for tightening or loosening the chuck jaws 7, 7, as will be understood from the showing. My holder in the form here shown is formed of rubber and includes a body of tubular form, designated 18', with a wing portion 19, having a hole therethrough adapted to be placed over the spool-like member 14, as indicated, whereby said mechanism is attached to the holder 18; and said member is placed on the cable 17. The cable is shown in section in Fig. 2, and shows three wires therein.

In Fig. 3, I have shown a modified form of my holder in which the wing portion 19' is split to facilitate placing it on a cable or other member, instead of threading it on, as would have to be done in the form of the invention shown in Figs. 1 and 2. The split is indicated at the line 20, whereby said member can be placed over a cable by opening up said two sides and then afterward putting the spool-like member 14 therein, which operates to hold said parts together and forms a bearing for the short shaft 10, before described.

In Figs. 4 and 5, I have shown further modification of my invention. In this embodiment, I have shown the sleeve or tubular body portion of the holder split along the line 21, and provided at each end with circumferential grooves, as 22, to receive two split rings, 23, 23, for holding said parts together.

Another improved feature is shown in the sectional or end view of Fig. 5, and that is, when the device is made of rubber, or other flexible material, the bore or open center is formed with corrugation-like ribs, as 24, extending longitudinally thereof. This makes possible the application of the device to different sizes of cables, or holding members. This will be understood when it is realized that these ribs, being flexible, will yield to adjust the body to a larger cable than the innermost diameter of said body. The ribs can bend or be pressed into the spaces between said rib portions.

I do not limit my invention to the exact details shown and described for purposes of explanation of the invention, knowing that other